US008626546B2

(12) United States Patent
Westendorf et al.

(10) Patent No.: US 8,626,546 B2
(45) Date of Patent: Jan. 7, 2014

(54) PROCESS FOR COMPUTER-IMPLEMENTED MANAGEMENT OF ONE OR MORE TARGET AGREEMENTS AND A TARGET AGREEMENT COMPUTER SYSTEM

(75) Inventors: Frank Westendorf, Ubstadt-Weiher (DE); Michael Ihle, Forst (DE); Lars Wiesner, Heidelberg (DE)

(73) Assignee: SAP AG, Walldorf (DE)

( * ) Notice: Subject to any disclaimer, the term of this patent is extended or adjusted under 35 U.S.C. 154(b) by 2319 days.

(21) Appl. No.: 10/642,151

(22) Filed: Aug. 18, 2003

(65) Prior Publication Data

US 2004/0193486 A1 Sep. 30, 2004

(30) Foreign Application Priority Data

Mar. 24, 2003 (WO) .................. PCT/EP03/03044

(51) Int. Cl.
*G06Q 30/00* (2012.01)
(52) U.S. Cl.
USPC .......................................... 705/7.14; 705/30
(58) Field of Classification Search
USPC ............................................................ 705/30
See application file for complete search history.

(56) References Cited

U.S. PATENT DOCUMENTS

| | | | | |
|---|---|---|---|---|
| 5,893,905 A * | 4/1999 | Main et al. | ..................... | 705/7.38 |
| 5,905,715 A * | 5/1999 | Azarmi et al. | ................. | 370/244 |
| 6,018,718 A * | 1/2000 | Walker et al. | ................... | 705/14 |
| 6,055,510 A * | 4/2000 | Henrick et al. | ................. | 705/14 |
| 6,128,599 A * | 10/2000 | Walker et al. | ............. | 705/14.27 |
| 6,366,666 B2 * | 4/2002 | Bengtson et al. | ........ | 379/265.06 |
| 6,377,936 B1 * | 4/2002 | Henrick et al. | ................. | 705/14 |
| 6,434,534 B1 * | 8/2002 | Walker et al. | ................... | 705/14 |
| 6,944,596 B1 * | 9/2005 | Gray et al. | ..................... | 705/321 |
| 7,027,400 B2 * | 4/2006 | O'Neill | ......................... | 370/235 |
| 7,065,496 B2 * | 6/2006 | Subbloie et al. | ................. | 705/11 |
| 7,121,830 B1 * | 10/2006 | Kaplan et al. | .................. | 434/219 |
| 7,222,109 B1 * | 5/2007 | Flanagan et al. | ................ | 705/80 |
| 7,437,309 B2 * | 10/2008 | Magrino et al. | ............. | 705/7.14 |
| 7,848,947 B1 * | 12/2010 | McGloin et al. | ............. | 705/7.42 |
| 2002/0133383 A1 * | 9/2002 | Chao et al. | ......................... | 705/7 |
| 2002/0169678 A1 * | 11/2002 | Chao et al. | ........................ | 705/26 |
| 2002/0188535 A1 * | 12/2002 | Chao et al. | ........................ | 705/35 |
| 2003/0204423 A1 * | 10/2003 | Koller et al. | ....................... | 705/7 |
| 2003/0204433 A1 * | 10/2003 | Botscheck et al. | ................. | 705/9 |
| 2007/0208637 A1 * | 9/2007 | Cooper et al. | ................... | 705/30 |

\* cited by examiner

*Primary Examiner* — John Van Bramer
*Assistant Examiner* — Stacie Gatling
(74) *Attorney, Agent, or Firm* — Finnegan, Henderson, Farabow, Garrett & Dunner, LLP

(57) ABSTRACT

A process and system for the computer-implemented management of one or more target agreements with one or more parties to the agreement by means of a target agreement computer system are provided. Each of the target agreements may comprise at least one performance target, the performance target being a measurable target value to be achieved within a given or predetermined time span, where at the start of the time span an individual target agreement is defined and at the end of the time span the degree of achievement of each measurable target value and hence of each performance target is automatically determined and an incentive payment dependent thereon is calculated and distributed. A calculation module may be provided in which the definition of an assessment scale for determining the degree of achievement of the values is laid down, and a remuneration module may be provided in which the incentive payment belonging to an assessment resulting from the assessment module is laid down. Further, an interface to a performance objective management computer system may be provided in which one or more target values for the performance target are managed. In one embodiment, the interface is used to import target values forming the basis for a comparison of target values and actual values to be carried out in the target agreement computer system.

28 Claims, 4 Drawing Sheets

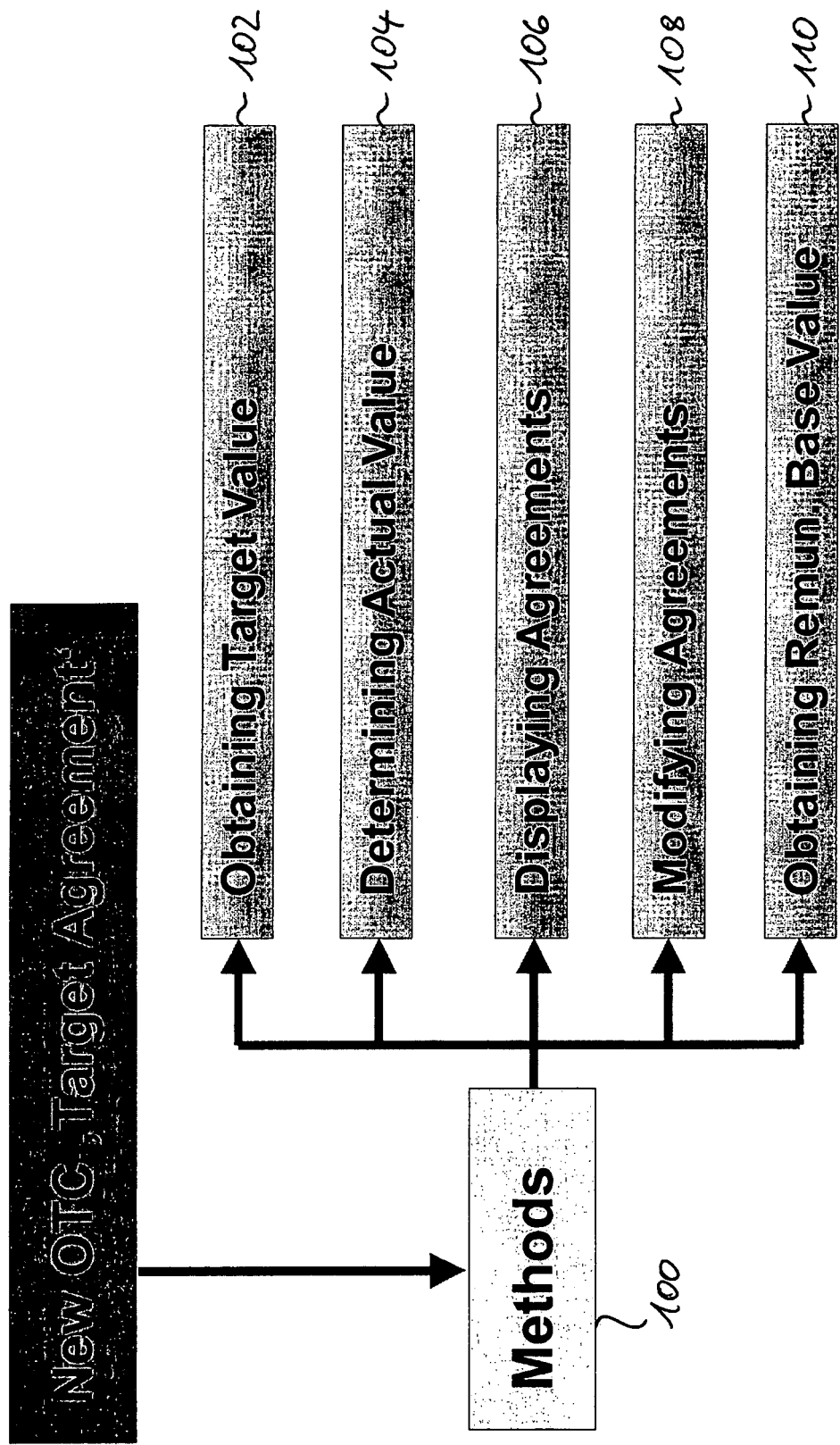

PROCESS FOR COMPUTER-IMPLEMENTED MANAGEMENT OF ONE OR MORE TARGET AGREEMENTS AND A TARGET AGREEMENT COMPUTER SYSTEM

This application claims priority from PCT/EP 03/03044 filed Mar. 24, 2003.

FIELD OF THE INVENTION

The present invention generally relates to a process for the computer-implemented management of one or more target agreements with one or more parties to the agreement and a target agreement computer system for carrying out such a process. The invention further relates to a computer program product with a computer-readable medium and a computer program stored on the computer-readable medium with program coding means which are suitable for carrying out such a process when the computer program is run on a computer.

BACKGROUND INFORMATION

Managing employee compensation plans has traditionally been done manually on spreadsheets or in-house developed applications. For large organizations, compensation plans are typically complex, involve rewards such as commissions, bonuses, splits, accelerators, draws, caps, etc. and are notoriously difficult to maintain and manage accurately. Target agreements (also called objective agreements) play an important role in modern staff management in conjunction with assessment systems. As a rule, target agreements are used within the framework of a consultation, promotion or annual interview, in which a senior person works together with an employee or a staffer (i.e., a member of staff) or colleague to set qualitative and quantitative goals which will be looked at on a one-off basis or at regular intervals (generally at yearly or half-yearly intervals, but according to recent experience at more frequent intervals) to check the extent to which the goals have been achieved. In the case of performance-related pay, an incentive payment will be made depending on the targets achieved. Obviously, this principle can also be applied to agreements between a client and a contractor, e.g., with a contractor acting on the basis of a consultancy agreement or the like.

There are already computer programs in existence for the computer-aided management and calculation of commission on the basis of input target amounts in accordance with an agreement and input actual amounts which are input after examining the degree to which targets have been met. Thus, the known computer programs are solutions in which a number of target agreements are run separately or independently of one another. In other words, known systems merely automatically perform the steps which had previously been done on paper by the parties involved in the target agreement (generally the management and employees). However, there exists a need for a more accurate target agreement system in view of complex plans to be kept, which in the prior art results in organizations and enterprises wasting money by overpaying their staff as the existing systems are not able to keep accurate track of the complex plans underlying the target agreements.

SUMMARY OF THE INVENTION

In contrast thereto, embodiments of the invention propose a process for computer-implemented management of target agreements and a target agreement computer system with one or more of the features disclosed herein.

In accordance with embodiments of the invention, an interface is provided through which target values are imported for the purpose of a comparison of target values with actual values. The comparison of the target/actual values may be carried out in a target agreement computer system. These target values are imported, for example, from a performance target management computer system which manages central data and general and individual target values within the scope of a modern personnel management computer system (Human Capital Management—HCM) used for so-called Management By Objectives (MBO) or from a Corporate Performance Management System in the field of strategic management. Embodiments of the invention thus makes it possible to undertake a complex comparison, which is virtually impossible in larger bodies or institutions, between individual agreements and central management decisions with which the outline conditions for the MBO forming the basis for the target agreements are defined and amended.

Embodiments of the invention can also ensure that the individual target agreements and the basis for calculating incentive payments or commissions are right up to date. Tying the functions anchored in the Human Capital Management framework to the administration of employee data thus leads to a complex performance-dependent calculation of remuneration in the target agreement system. Further, it is easier to measure/monitor the target agreements of the company and transparency is guaranteed as the party to the agreement can inspect them.

In accordance with embodiments of the invention, a system is also provided that allows timely accurate collection and processing of relevant data in a complex target agreement environment. The system may provide precise and fast commission and bonus payments, and allow for back-analysis (history of achievements), interim simulations and/or forecasting (extrapolation of current status), thus leading to an improved motivation of members of staff. Further, the system may adapt to changes in calculation rules which occur often and rapidly when changes are made in an organizational structure due to changing business conditions. Thus, incentives and commissions can be better processed in a modern enterprise which has to adjust to market requirements at a heightened pace.

According to an advantageous embodiment of the invention, the interface may be constructed by means of an object type category connection or link, making it easier to connect to different systems at the interface.

A suitable object type category preferably comprises obtaining or collecting a target value, determining the actual value, displaying the target agreements, modifying the target agreements and obtaining or collecting the remuneration base value.

In one embodiment, obtaining the target value involves obtaining and providing the target values of the target agreements based on a specific time span and a specific commissions contract (target agreement).

In another embodiment, obtaining the actual value involves obtaining and providing (making available) the actual values achieved in connection with a target agreement based on or related to a specific time span or period and a specific commissions contract.

According to yet another embodiment, displaying the target agreements involves displaying the target agreements related to a specific time period in the commissions contract.

In still another embodiment, modifying the target agreements involves modifying the target agreements related to a specific time period in the commissions contract.

In another embodiment, obtaining the remuneration base value involves inputting the remuneration base value, which can vary for different target agreements, into the calculation module.

According to yet another embodiment of the invention, standard target agreements are laid down in the target agreement system, on the basis of which individual target agreements can be produced. The personnel management system in turn contains electronic forms, so-called templates, on the basis of which employee-specific documents are generated. When a target agreement is being generated with a specific employee (i.e., a party to the agreement) an allocation is made in the form of a link between the employee-specific document of the HCM or MBO (MBO document) and the target agreement. According to one embodiment of the invention, the link may be made on the basis of an object type link or a so-called logical service. The linking of the personnel administration systems and operative systems, which are normally separated, thus makes it possible to maintain (or attend to) performance targets (or performance objectives) by means of data which will in any case be input into the MBO system (staff management system). Advantageously, the standard target agreement is maintained on a periodic basis.

Alternatively or cumulatively, the performance target data can be maintained or attended to (i.e., updated, corrected, adapted, etc.) via a dialogue device of the target agreement system, the input data affecting the MBO documents as a result of the linking of MBO documents with a target agreement or the commission agreement on which it is based. An association between an MBO document and a commission agreement is permissible precisely when the MBO document is based on a template of the MBO system which is associated with a standard target agreement of the target agreement system, which is in turn part of the standard commission contract which forms the basis for the specific commission contract. In another advantageous embodiment of the invention, the templates of the MBO system with the standard agreements of the target agreement system are therefore connected to one another by means of an object type category link or a logical service.

Embodiments of the invention also relate to a computer program with program coding means which are suitable for carrying out a process for managing target agreements, consistent with the features described above, when the computer program is run on a computer. Embodiments of the computer program itself, as well as the computer program stored on a computer-readable medium, will be apparent from the detailed description and accompanying drawings.

Further features and embodiments of the invention will be apparent from the description and the accompanying drawings.

It will be understood that the features mentioned above and those described hereinafter can be used not only in the combinations specified, but can also be combined in other combinations or used on their own, without departing from the scope and the spirit of the present invention.

The invention is schematically illustrated in the drawings by means of exemplary embodiments and is hereinafter explained in detail with reference to the drawings. It is understood that the description is in no way limiting on the scope of the present invention and is merely an illustration of the preferred embodiments of the invention.

BRIEF DESCRIPTION OF THE DRAWINGS

In the drawings,

FIG. 4 illustrates methods of an object type class, consistent with embodiments of the present invention.

DETAILED DESCRIPTION

Figure 1:
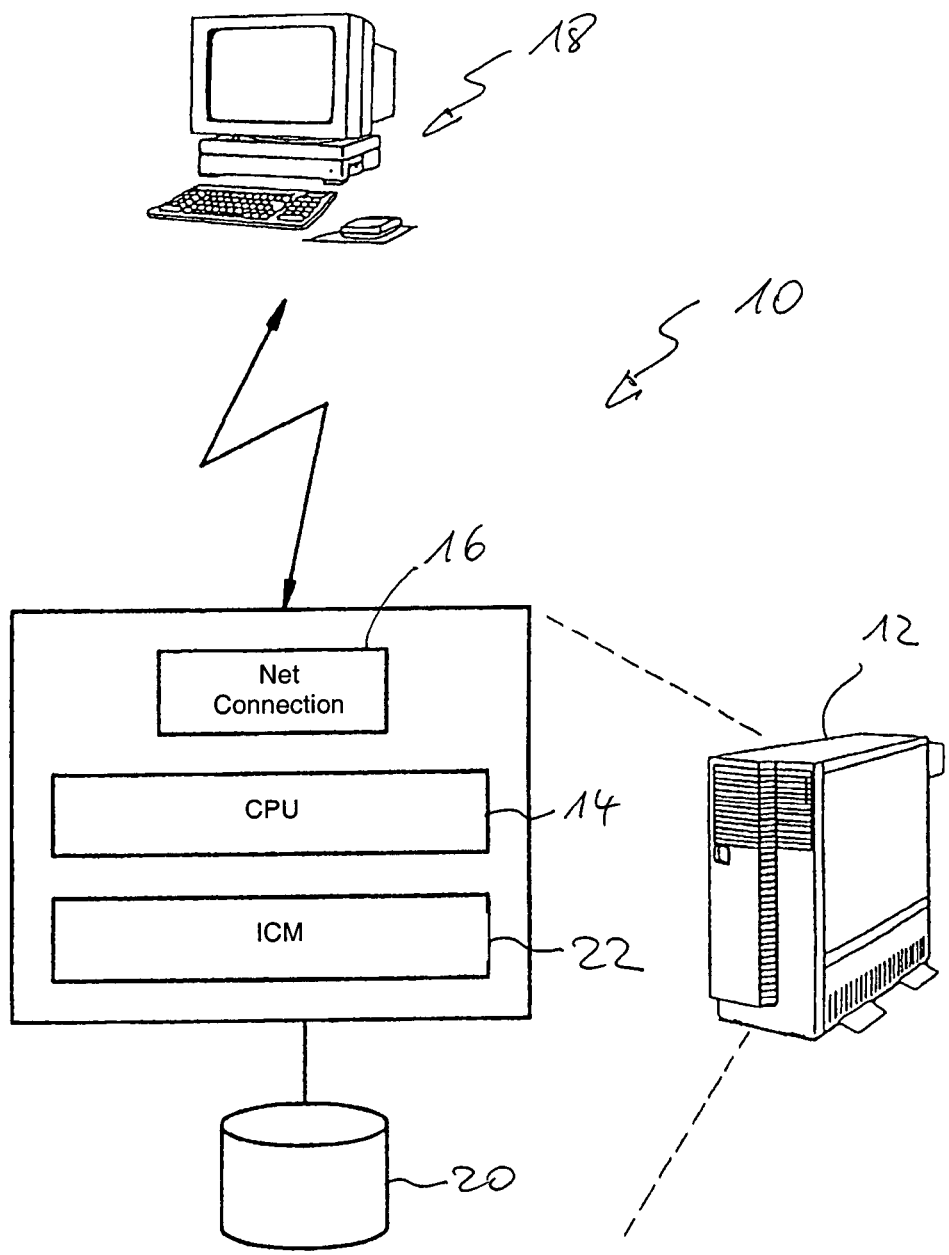
FIG. 1 is a schematic view of a target agreement computer system, according to an embodiment of the invention.

FIG. 1 shows a schematic block diagram representation of a target agreement system 10, according to an embodiment of the present invention. Computer system 10 comprises a server 12 with a central processing unit CPU 14, a network connection 16 for connection with at least one input/output means 18, at least one database means 20 containing target agreement and commission data relating to target agreement creation between two or more agreement parties. The target agreement system 10 further comprises an Incentive and Commissions Management (ICM) system 22. The system as shown in FIG. 1 is used in the management of one or more target agreements (72) with one or more parties to the agreement, the target agreements (72) each comprising at least one performance target. A performance target is a measurable prescribed or set value to be achieved within a given or predetermined time span or period. The value is part of the agreement and might be altered during the agreement life time. At the start of the time span, an individual target agreement is defined and at the end of the time span the degree of achievement of the individual prescribed values and hence of the targets is determined (automatically or via manual input) and an incentive payment dependent thereon is calculated and distributed. In FIG. 1, a dialogue device or interface may be implemented with a computer (such as I/O device 18) in order to attend to or update the performance target data. Further, computerized determining and output means may be provided (e.g., as part of server 14 or I/O device 18) to analyze and output various information based on the data indicating the degree of achievement (past or present). Accordingly, target agreement system 10 may be adapted to allow for back-analysis (history of achievements), interim simulations and/or forecasting (extrapolation of current status).

Figure 2:
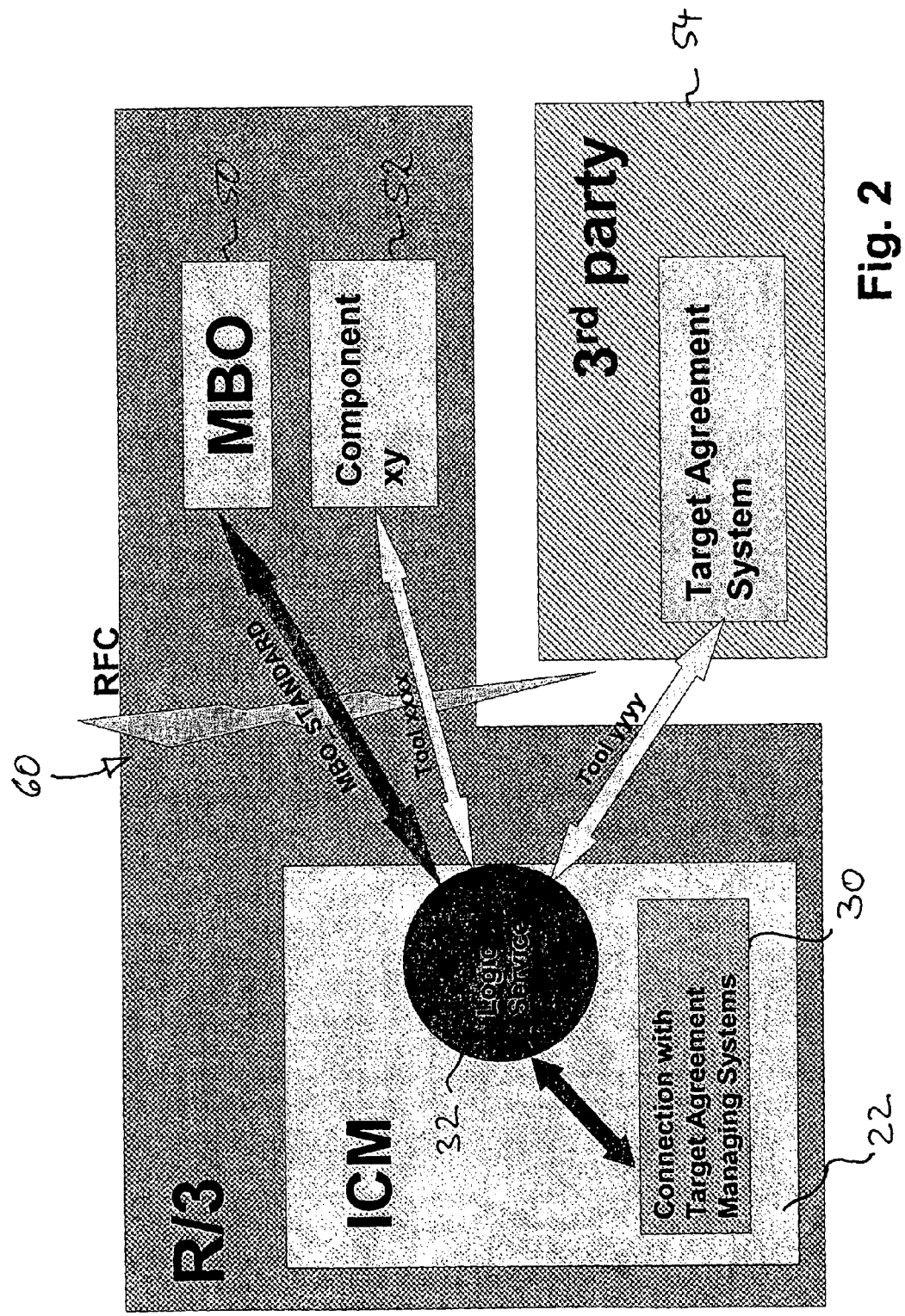
FIG. 2 is a schematic block diagram representation of a target agreement computer system, according to an embodiment of the invention.
Figure 3:
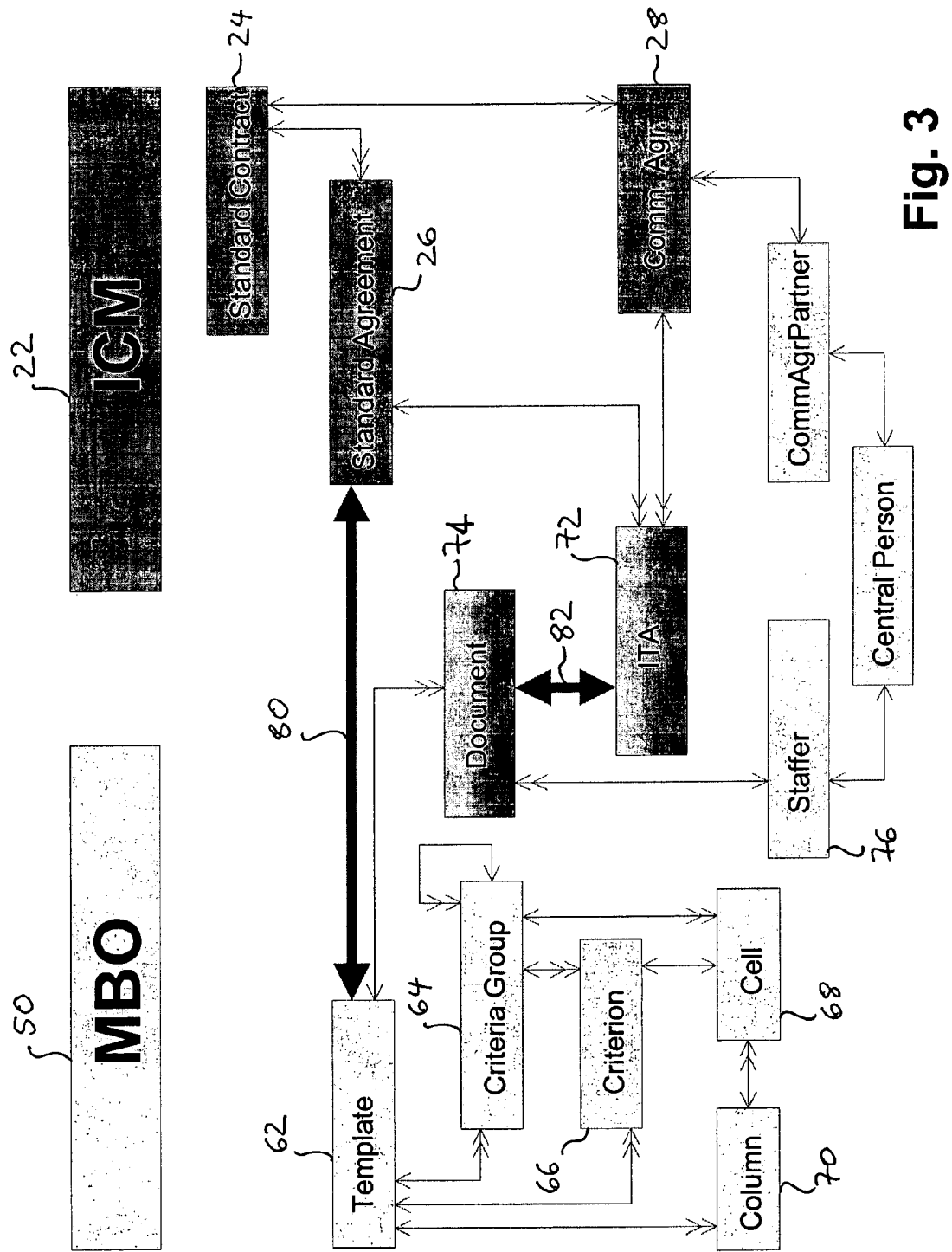
FIG. 3 is a detailed block diagram of a target agreement computer system, according to another embodiment of the invention.

Referring now to FIGS. 2 and 3, additional embodiments of the target agreement system are described in detail. The ICM system 22, which may be advantageously embedded in a SAP R/3 environment, provides for a periodical determination of result achievements of a contracting person (e.g., staffer, employee, colleague, contributor, contractor, etc.) and subsequent incentive payment depending on the targets and results achieved. Therefore, the ICM system 22 disposes of data relating to standard contracts 24, standard agreements 26 and (individual) commission agreements 28 by comprising a target agreement managing system 30 connected to database 20. In particular, the ICM system 22 comprises a calculation module (not shown) in which the definition of an assessment scale for determining the degree of achievement of the prescribed values is laid down, and a remuneration module (not shown) in which the incentive payment for an assessment resulting from the assessment module is laid down.

An ICM system generally consists of three core functions, i.e., compensation management, reporting and modelling, and finds application for example in the management of incentive plans of sales staff working for large companies. However, there is a need for an automated system, according to embodiments of the present invention, which extends beyond the possibilities of known ICM systems into wider business areas to reward staff in other departments, as well as the extended business of channel and distribution partners.

According to an embodiment of the invention, the target agreement managing system 30 may be linked to a performance objective management system providing access to administrative data, e.g., personalized target agreements.

Possible performance objective management systems are depicted on the right hand side of FIG. 2. They can comprise systems that are also embedded in the SAP R/3 environment like a Management By Objectives (MBO) system 50 and/or any other suitable component 52, and/or any third party system 54 that is outside of the SAP environment. Linkage between the ICM system 22 and the system in which the target values for the performance target are managed may be achieved via interface and remote function call (RFC) capable functional modules, such as BADIs (Business Add-Ins) and BAPIs (Business Application Programming Interfaces), schematically illustrated at 60 in FIG. 2. Appropriate tools can be used to achieve the linkage, such as the MBO standard tool or any other tool designed for the relevant system component.

The connection between the target agreement managing system 30 and the interface 60 may be advantageously provided by one or more so-called logic services 32, which is a service tool included in the SAP ICM system (logic services may be described as "soft" interfaces). For this, a new object type class has to be generated in the logic services, comprising the methods 100 depicted in FIG. 4. The methods 100 may include: obtaining a target value 102, determining the actual value 104, displaying the target agreements 106, modifying the target agreements 108, and obtaining the remuneration base value 110.

In method 102, the target values of the target agreements based on a specific time span and a specific commissions contract (target agreement) are obtained and provided. In particular, the target values are obtained or retrieved from the performance target management system, e.g., the MBO system. In method 104, the actual values achieved in connection with a target agreement based on a specific time span and a specific commissions contract are obtained and provided. The actual values can also be obtained from the performance target management system, but they could also be obtained from different systems or sources. In method 106, the target agreements in relation to a specific time span in the commissions contract are displayed. In method 108, the target agreements in relation to a specific time span in the commissions contract are modified. Finally, in method 110, the remuneration base value, which can vary for different target agreements, are input into the calculation module of the ICM system 22.

Referring again to FIG. 3, the target agreement system 10 may operate as follows. As already pointed out above, the ICM system 22 comprises a standard contract 24, a standard (target) agreement 26 and an individual commission agreement 28. The MBO system 50 comprises a template 62, a criteria group 64, a criterion 66, a cell 68 and a column 70. The cell 68 contains the individual data and the column 70 contains the targets.

In FIG. 3, the thin line arrows between the block diagram boxes are 1:n arrows, i.e., a single arrowhead stands for an unequivocal unambiguous relation, and a double arrowhead stands for an equivocal ambiguous relation. For example, the standard contract is the basis for a plurality of standard target agreements (double arrowhead pointing from 24 to 26), but each of the plurality of standard target agreements is based on one and only one standard contract (single arrowhead pointing from 26 to 24). This means that there is a 1:n relation between standard contract 24 and standard target agreement 26. The same applies to the relation between standard contract 24 and commission agreement 28.

On the basis of a standard target agreement 26 and a commission agreement 28, one or more individual target agreements (ITA) 72 can be generated. Again, there is a 1:n relation between standard target agreement 26 and commission agreement 28 on the one hand, and the generated agreements 72 on the other hand.

On the basis of the template 62 of the MBO system 50, an individual target agreement document 74 can be generated and assigned to an employee. Again, as can be seen from FIG. 3, there is a 1:n relation between template 62 and document 74.

Agreement ITA 72 and document 74 are newly generated documents. They contain the criteria groups and criteria that are already set up in the template.

It shall be appreciated that up to this stage, there is no interaction between the ICM system 22 depicted at the right side of FIG. 3 and the MBO system 50 depicted at the left side of FIG. 3.

Now, according to an embodiment of the invention, an interface may be provided between the two systems, notably a logic service interface as described above, which is illustrated in FIG. 3 by means of thick lined double arrows 80, 82. The interface connection according to the invention provides an interaction and data flow between the standard agreement generation system and the individual data-containing system. In particular, there is a link between the standard agreement 26 and the template 62 so that exactly one MBO template is assigned to one ICM standard agreement. This is achieved by entering the name of a relevant MBO template in the customizing database upon generation of a standard agreement form. Any time a change occurs, the customizing data can be maintained within a short time, thus enabling a user to change relations and assignments between a plurality of documents by merely adapting the assignment between higher order documents. As is appreciated, one template which is defined for use with the ICM system can be used for a plurality of standard target agreements.

Referring still to FIG. 3, there can be several documents 74 assigned to one "staffer" 76 (employee, etc.). Each document contains the criteria and criteria groups already embodied in the template. All changes to performance targets will be made exclusively in the MBO system which are then again available to the ICM system, thus rendering the whole process of updating and adapting complex system data less cumbersome. Further, current (actual) data on achievements regarding performance targets entered in the MBO system is readily available for calculation of remuneration and commission payments in the ICM system.

A given MBO document 74 can be assigned to a given commission agreement on condition that the given document is based on a template which is assigned or linked to a standard target agreement which forms part of the standard commission contract being the basis for the given commission agreement. This results in an assignment of one or more MBO documents to a given commission agreement.

What is claimed is:

1. A process for the computer-implemented management of one or more target agreements with one or more parties to the agreement by using a target agreement computer system, in which said target agreements each comprise at least one performance target, a performance target being a measurable target value to be achieved within a predetermined time span, where at the start of said time span an individual target agreement is newly defined and at the end of said time span the degree of achievement of each measurable target value and hence of each performance target is determined and an incentive payment dependent thereon is calculated and distributed, the process comprising:

generating the individual target agreement based on a standard agreement linked to a template of a performance objective management computer system, wherein the individual target agreement and an individual target agreement document contain the performance targets;

providing a calculation module in which the definition of an assessment scale for determining the degree of achievement of said measurable target values is laid down;

providing a remuneration module in which said incentive payment belonging to an assessment resulting from said assessment module is laid down; and providing an interface to the performance objective management computer system in which said measurable target values for said performance targets are managed, said measurable target values forming the basis for a comparison of target values and actual values to be carried out in said target agreement computer system being imported via said interface, wherein the comparison between said target values and said actual values is used to track and determine a current degree of achievement of said measurable target values at any given time within the predetermined time span, the performance objective management computer system generates the individual target agreement document based on the template linked to the standard agreement, and the individual target agreement document of the performance objective management system is linked to the individual target agreement of the target agreement computer system generated from the standard agreement.

2. A process according to claim 1, wherein the process further comprises providing a segment allocation module in which the definition of the responsibilities of at least one party to the agreement is laid down.

3. A process according to claim 1, wherein the process further comprises constructing said interface by way of an object type category connection or link.

4. A process according to claim 3, wherein said object type category connection comprises a plurality of methods, said methods including at least one of:
   obtaining a target value;
   determining the actual value;
   displaying the target agreements;
   modifying the target agreements; and
   obtaining the remuneration base value.

5. A process according to claim 4, wherein obtaining said target value comprises obtaining and providing said measurable target values of said target agreements based on a specific time span and a specific commissions contract.

6. A process according to claim 4, wherein obtaining said actual value comprises obtaining and providing said actual values achieved in connection with a target agreement based on a specific time span and a specific commissions contract.

7. A process according to claim 4, wherein displaying said target agreements comprises displaying said target agreements in relation to a specific time span in the commissions contract.

8. A process according to claim 4, wherein modifying said target agreements comprises modifying said target agreements in relation to a specific time span in said commissions contract.

9. A process according to claim 4, wherein obtaining said remuneration base value comprises inputting said remuneration base value, which can vary for different target agreements, into said calculation module.

10. A process according to claim 1, wherein standard target agreements are laid down in said target agreement system, on the basis of which individual target agreements can be produced, and wherein said performance objective management system contains electronic forms on the basis of which party-specific documents can be generated.

11. A process according to claim 10, wherein upon creation of a target agreement with a party to said agreement an allocation is generated in the form of a link between said party-specific document and said target agreement.

12. A process according to claim 11, wherein a dialogue device of said target agreement computer system processes said performance target data.

13. A target agreement computer system for the computer-implemented management of one or more target agreements with one or more parties to the agreement, wherein said target agreements each comprise at least one performance target, a performance target being a measurable target value to be achieved within a predetermined time span, where at the start of said time span an individual target agreement is newly defined and at the end of said time span the degree of achievement of each measurable target value and hence of each performance target is determined and an incentive payment dependent thereon is calculated and distributed, the system comprising:

a storage module storing a standard agreement for generating the individual target agreement, wherein the standard agreement is linked to a template of a performance objective management system;

a generation module in which the individual target agreement is generated based on the standard agreement, wherein the individual target agreement and an individual target agreement document contain the performance targets;

a calculation module in which the definition of an assessment scale for determining the degree of achievement of said measurable target values is laid down;

a remuneration module in which said incentive payment belonging to an assessment resulting from said assessment module is laid down; and an interface to a performance objective management computer system in which said measurable target values for said performance targets are managed, said measurable target values forming the basis for a comparison of target values and actual values to be carried out in said target agreement computer system being imported via said interface, wherein the comparison between said target values and said actual values is used to track and determine a current degree of achievement of said measurable target values at any given time within the predetermined time span, the performance objective management computer system generates the individual target agreement document based on the template linked to the standard agreement, and the individual target agreement document of the performance objective management system is linked to the individual target agreement of the target agreement computer system generated from the standard agreement.

14. A system according to claim 13, further comprising a segment allocation module in which the definition of the responsibilities of the party to the agreement is laid down.

15. A system according to claim 13, wherein said interface is constructed by way of an object type category connection or link.

16. A system according to claim 15, wherein said object type category comprises a plurality of methods, said methods including at least one of:

obtaining a target value; determining the actual value; displaying the target agreements;

modifying the target agreements; and obtaining the remuneration base value.

17. A system according to claim 16, wherein said method of obtaining said target value comprises obtaining and providing said target values of said target agreements based on a specific time span and a specific commissions contract.

18. A system according to claim 16, wherein said method of obtaining said actual value comprises obtaining and providing said actual values achieved in connection with a target agreement based on a specific time span and a specific commissions contract.

19. A system according to claim 16, wherein said method of displaying said target agreements comprises displaying said target agreements in relation to a specific time span in said commissions contract.

20. A system according to claim 16, wherein said method of modifying said target agreements comprises modifying said target agreements in relation to a specific time span in said commissions contract.

21. A system according to claim 16, wherein said method of obtaining said remuneration base value comprises inputting said remuneration base value, which can vary for different target agreements, into said calculation module.

22. A system according to claim 13, wherein standard target agreements are laid down in said target agreement system, on the basis of which individual target agreements can be produced, and wherein said performance objective management system contains electronic forms on the basis of which party-specific documents can be generated.

23. A system according to claim 22, wherein upon creation of a target agreement with a party to said agreement an allocation is generated in the form of a link between said party-specific document and said target agreement.

24. A system according to claim 23, further comprising a dialogue device configured to process said performance target data.

25. A system according to claim 13, further comprising means for determining at any given time the current degree of achievement for a given target agreement.

26. A system according to claim 13, further comprising means for determining at any given time the historical development of the degree of achievement.

27. A system according to claim 25, further comprising means for extrapolating the expected further development of the degree of achievement as well as according assessments and remunerations.

28. A computer-readable medium with a computer program stored thereon, said computer program comprising program coding means for carrying out a process according to any one of claims 1 to 12 when said computer program is run on a computer.

* * * * *